(12) United States Patent
Jung

(10) Patent No.: US 9,891,485 B2
(45) Date of Patent: Feb. 13, 2018

(54) LIQUID CRYSTAL DISPLAY

(71) Applicant: Samsung Display Co. Ltd., Yongin (KR)

(72) Inventor: Keum Dong Jung, Seoul (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days.

(21) Appl. No.: 15/137,528

(22) Filed: Apr. 25, 2016

(65) Prior Publication Data

US 2017/0010508 A1 Jan. 12, 2017

(30) Foreign Application Priority Data

Jul. 8, 2015 (KR) .................. 10-2015-0097249

(51) Int. Cl.
*G02F 1/1343* (2006.01)
*G02F 1/1362* (2006.01)

(52) U.S. Cl.
CPC .... *G02F 1/13439* (2013.01); *G02F 1/136213* (2013.01); *G02F 1/136227* (2013.01); *G02F 2001/134345* (2013.01); *G02F 2001/136218* (2013.01)

(58) Field of Classification Search
CPC ............ G02F 1/134309; G02F 1/1368; G02F 1/13439; G02F 1/136213; G02F 2001/136218; G02F 2001/134354; H01L 27/1255; H01L 27/3265
See application file for complete search history.

(56) References Cited

U.S. PATENT DOCUMENTS

| 2012/0044434 A1* | 2/2012 | Yoon | G09G 3/3659 349/38 |
| 2012/0062527 A1* | 3/2012 | Cheong | G02F 1/1347 345/204 |
| 2016/0147123 A1* | 5/2016 | Cheng | G02F 1/134363 257/72 |

(Continued)

FOREIGN PATENT DOCUMENTS

| KR | 1020090116095 | 11/2009 |
| KR | 101174164 | 8/2012 |
| KR | 1020120130983 | 12/2012 |

(Continued)

*Primary Examiner* — Joseph L Williams
*Assistant Examiner* — Jose M Diaz
(74) *Attorney, Agent, or Firm* — Cantor Colburn LLP

(57) ABSTRACT

A liquid crystal display includes a first substrate, a second substrate disposed to face the first substrate and including a common electrode, and a liquid crystal layer interposed between the first and second substrates, where the first substrate includes an insulating substrate, a thin-film transistor which is disposed on the insulating substrate and include a gate electrode, a first pixel electrode which is disposed on the insulating substrate to be spaced apart from the thin film transistor and charges a first voltage, a second pixel electrode which is disposed on the insulating substrate to be spaced apart from the thin film transistor, is disposed in a same layer as the first pixel electrode, and receives a second voltage having a magnitude different from the first voltage, and a storage electrode disposed on the same layer as the gate electrode and to overlap a portion of the second pixel electrode.

18 Claims, 12 Drawing Sheets

(56) References Cited

U.S. PATENT DOCUMENTS

2016/0161776 A1* 6/2016 Wang .................... G02F 1/1339
                                                         349/43
2016/0202582 A1* 7/2016 Paek ................. G02F 1/136209
                                                         349/43

FOREIGN PATENT DOCUMENTS

| KR | 101282563 | 6/2013 |
| KR | 1020150030326 | 3/2015 |
| KR | 101544847 | 8/2015 |

* cited by examiner

LIQUID CRYSTAL DISPLAY

This application claims priority to Korean Patent Application No. 10-2015-0097249 filed on Jul. 8, 2015, and all the benefits accruing therefrom under 35 U.S.C. § 119, the content of which is hereby incorporated by reference in its entirety.

BACKGROUND

1. Field

Exemplary embodiments of the invention relate to a liquid crystal display.

2. Description of the Related Art

A liquid crystal display is one of the most widely used types of flat panel display, and is a display which adjusts an amount of transmitted light by applying a voltage to an electrode to rearrange the liquid crystal molecules of a liquid crystal layer.

The liquid crystal display typically includes a lower substrate on which thin film transistors are disposed, an upper substrate disposed to face the lower substrate, and a liquid crystal layer disposed between the upper substrate and the lower substrate.

In such a liquid crystal display, a color filter for color display, a black matrix for preventing the light-leakage, an upper alignment film for the liquid crystal alignment, and a common electrode for generating the electric field are disposed on the upper substrate.

In such a liquid crystal display, a plurality of signal wirings, a thin film transistor, a pixel electrode, which generates an electric field by the switching operation of the thin film transistor, and a lower alignment film for the liquid crystal alignment are disposed on the lower substrate. Also, a storage electrode may be further disposed on the lower substrate to stably maintain the voltage charged in the pixel electrode until a next data signal is charged. The storage electrode serves to stably maintain the pixel voltage until the next data signal is charged

SUMMARY

In a liquid crystal display, a capacitance of a storage capacitor defined by a storage electrode is desired to be great to realize the high resolution. Generally, an area of the storage electrode may be increased to increase the capacitance of the storage capacitor. However, in a conventional liquid crystal display where the storage electrode is formed of a metallic materials together with the gate electrode of the thin film transistor, an aperture ratio of the liquid crystal display may decrease if the area of the storage electrode is increased to increase the capacitance value.

Exemplary embodiments provide a liquid crystal display with improved aperture ratio by improving the material of the storage electrode.

Exemplary embodiments further provide a liquid crystal display with improved visibility by improving a structure of the storage electrode.

An exemplary embodiment of a liquid crystal display includes a first substrate, a second substrate which is disposed to face the first substrate and includes a common electrode, and a liquid crystal layer interposed between the first substrate and the second substrate. In such an embodiment, the first substrate includes an insulating substrate, a thin-film transistor which is disposed on the insulating substrate and includes a gate electrode, a first pixel electrode which is disposed on the insulating substrate to be spaced apart from the thin film transistor and charges a first voltage, a second pixel electrode which is disposed on the insulating substrate to be spaced apart from the thin film transistor, is disposed in a same layer as the first pixel electrode, and receives a second voltage having a magnitude different from a magnitude of the first voltage and a storage electrode which is disposed in the same layer as the gate electrode, and is disposed to overlap a portion of the second pixel electrode.

In an exemplary embodiment, the magnitude of the first voltage may be greater than the magnitude of the second voltage.

In an exemplary embodiment, the storage electrode may include a transparent conductive material.

In an exemplary embodiment, each of the storage electrode and the second pixel electrode may include a pattern.

In an exemplary embodiment, the storage electrode may overlap only a portion of the pattern of the first pixel electrode or only a portion of the pattern of the second pixel electrode.

In an exemplary embodiment, the gate electrode may have a multi-layer structure including a transparent conductive material and a metallic material.

In an exemplary embodiment, the liquid crystal display may further includes a shielding electrode which is disposed in a same layer as the first pixel electrode and the second pixel electrode to overlap the thin film transistor.

In an exemplary embodiment, a voltage applied to the shielding electrode may have a same voltage level as the voltage applied to the common electrode.

In an exemplary embodiment, the storage electrode may include a first storage electrode layer including the transparent conductive material and a second storage electrode layer including a metallic material on the first storage electrode layer.

In an exemplary embodiment, a width of the first storage electrode layer may be wider than a width of the second storage electrode layer.

An exemplary embodiment of a liquid crystal device includes: a first substrate, a second substrate which is disposed to face the first substrate, and includes a common electrode, and a liquid crystal layer interposed between the first substrate and the second substrate. In such an embodiment, the first substrate includes an insulating substrate, first to third thin film transistors disposed on the insulating substrate, a first pixel electrode electrically connected to the first thin film transistor, a second pixel electrode electrically connected to the second first thin film transistor, a first storage electrode which is disposed to surround the first pixel electrode and includes a pattern, and a second storage electrode which is disposed to surround the second pixel electrode, includes a pattern and is connected to the third thin film transistor, where the first storage electrode or the second storage electrode overlaps only a portion of the pattern of the first pixel electrode or only a portion of the pattern of the second pixel electrode.

In an exemplary embodiment, the first storage electrode and the second storage electrode may include a transparent conductive material.

In an exemplary embodiment, each of the first storage electrode and the second storage electrode may include a first storage electrode layer including a transparent conductive material, and at least one of the first storage electrode and the second storage electrode may include a second storage electrode layer including a metallic material on the first storage electrode layer.

In an exemplary embodiment, a width of the first storage electrode layer may be wider than a width of the second storage electrode layer.

In an exemplary embodiment, the first pixel electrode may receive a first voltage, and the second pixel electrode may receive a second voltage having a magnitude less than the first voltage.

In an exemplary embodiment, an area of the first pixel electrode may be smaller than an area of the second pixel electrode.

In an exemplary embodiment, the liquid crystal display may further include a shielding electrode disposed in a same layer as the first pixel electrode and the second pixel electrode.

In an exemplary embodiment, wherein a magnitude of a voltage applied to the common electrode may be substantially the same as a magnitude of a voltage applied to the shielding electrode.

In an exemplary embodiment, a magnitude of a voltage applied to the shielding electrode may be substantially the same as a magnitude of a voltage applied to the first storage electrode or the second storage electrode.

BRIEF DESCRIPTION OF THE DRAWINGS

The above and other aspects and features of the invention will become more apparent by describing in detail exemplary embodiments thereof with reference to the attached drawings, in which.

DETAILED DESCRIPTION

Figure 1:
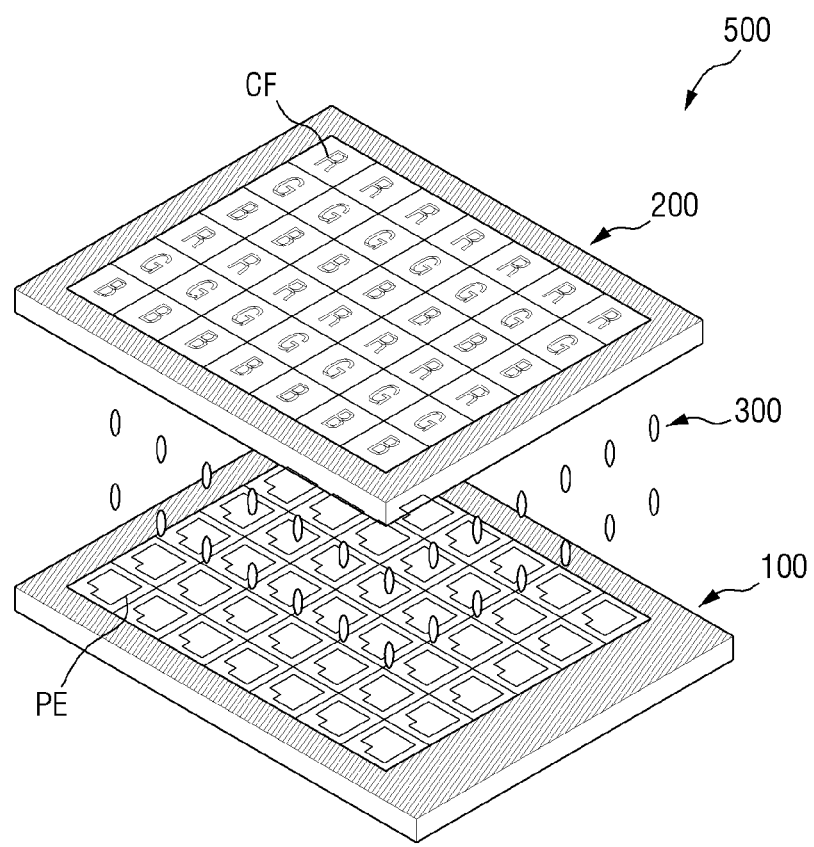
FIG. 1 is a schematic exploded perspective view of a liquid crystal display according to an embodiment of the invention.

In the following description, for purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the disclosure.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

Hereinafter, embodiments of the invention will be described with reference to the drawings.

FIG. 1 is a schematic exploded perspective view of a liquid crystal display according to an embodiment of the invention.

Referring to FIG. 1, an exemplary embodiment of a liquid crystal display 500 includes a first substrate (or a first display panel) 100, a second substrate (or a second display panel) 200, and a liquid crystal layer 300 interposed between the first substrate 100 and the second substrate 200.

The first substrate 100 includes a plurality of data lines and a plurality of gate lines, and may include a plurality of pixels which may be defined by the plurality of data lines and the plurality of gate lines. A thin film transistor and a pixel electrode PE for driving the liquid crystal molecules of the liquid crystal layer 300 may be disposed in each pixel. The pixel electrode PE may be provided with data voltage through the thin film transistor. The first substrate 100 may further include a storage electrode for maintaining the data voltage applied to the pixel electrode PE prior to the application of a next data voltage. Such a first substrate 100 will be described below in greater detail.

The second substrate 200 is a substrate which faces the first substrate 100, and may include a color filter CF for each pixel. The color filter CF may include red R, green G and blue B color filters CF. The red R, green G and blue B color filters CF may be alternately arranged. The pixel electrode PE of the first substrate 100 and a common electrode, which generates an electric field with the pixel electrode to control the alignment direction of the liquid crystal molecules, may be further disposed on the second substrate 200. The common electrode may be integrally formed as a single unitary and indivisible unit and disposed on the second substrate 200, regardless of the arrangement of the pixels.

The liquid crystal layer 300 may include a plurality of liquid crystal molecules having a dielectric anisotropy. The liquid crystal molecules may be vertically aligned liquid crystal molecules arranged in a direction perpendicular to the first substrate 100 and the second substrate 200. When an electric field is formed between the first substrate 100 and the second substrate 200, the liquid crystal molecules may rotate in a particular direction to transmit or block light.

Each pixel of the liquid crystal display of the invention will be described in greater detail with reference to FIGS. 2 to 4.

Figure 2:
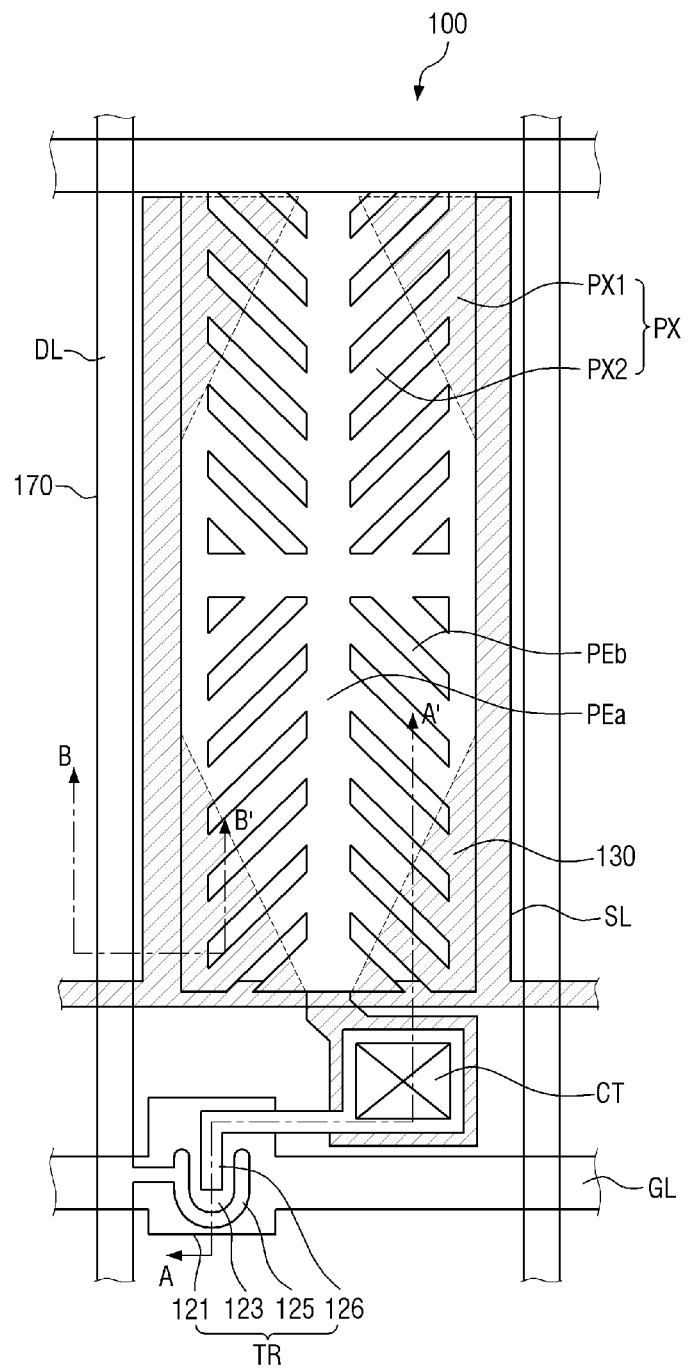
FIG. 2 is a schematic plan view of an embodiment of a pixel of a liquid crystal display according to the invention.
Figure 3:
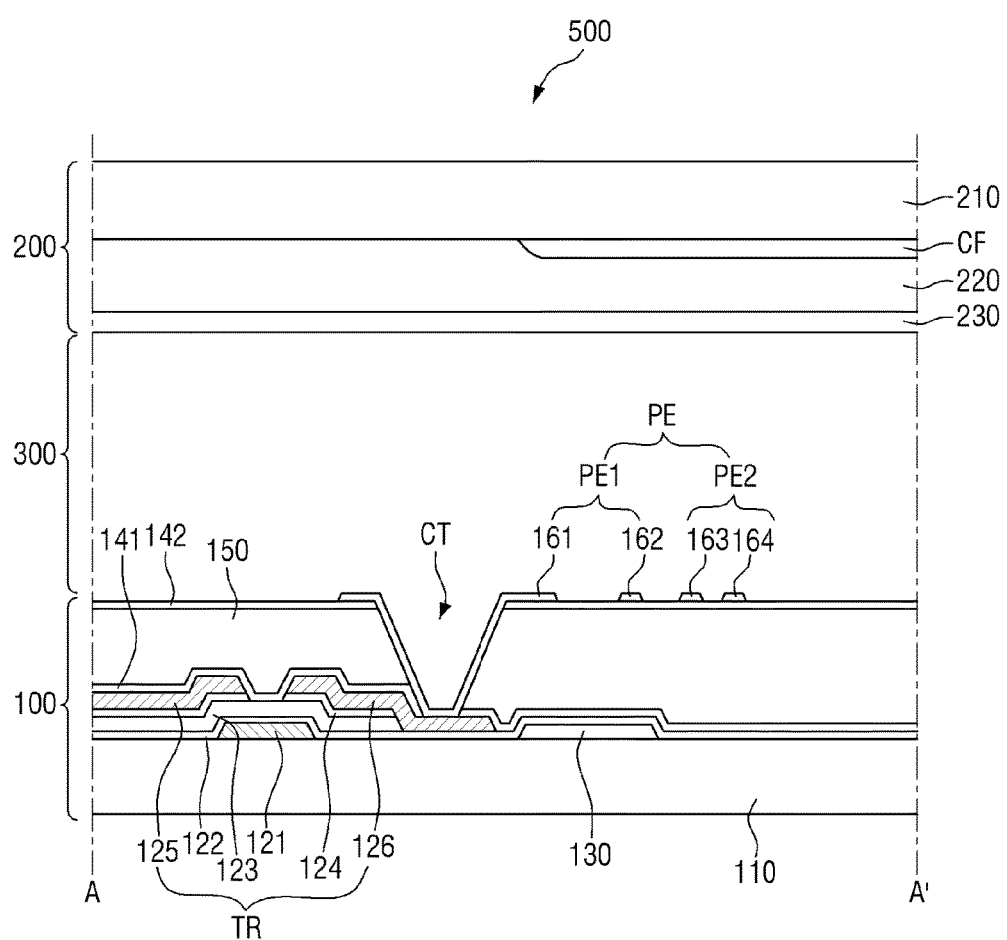
FIG. 3 is a schematic cross-sectional view taken along line A-A' of FIG. 2.
Figure 4:
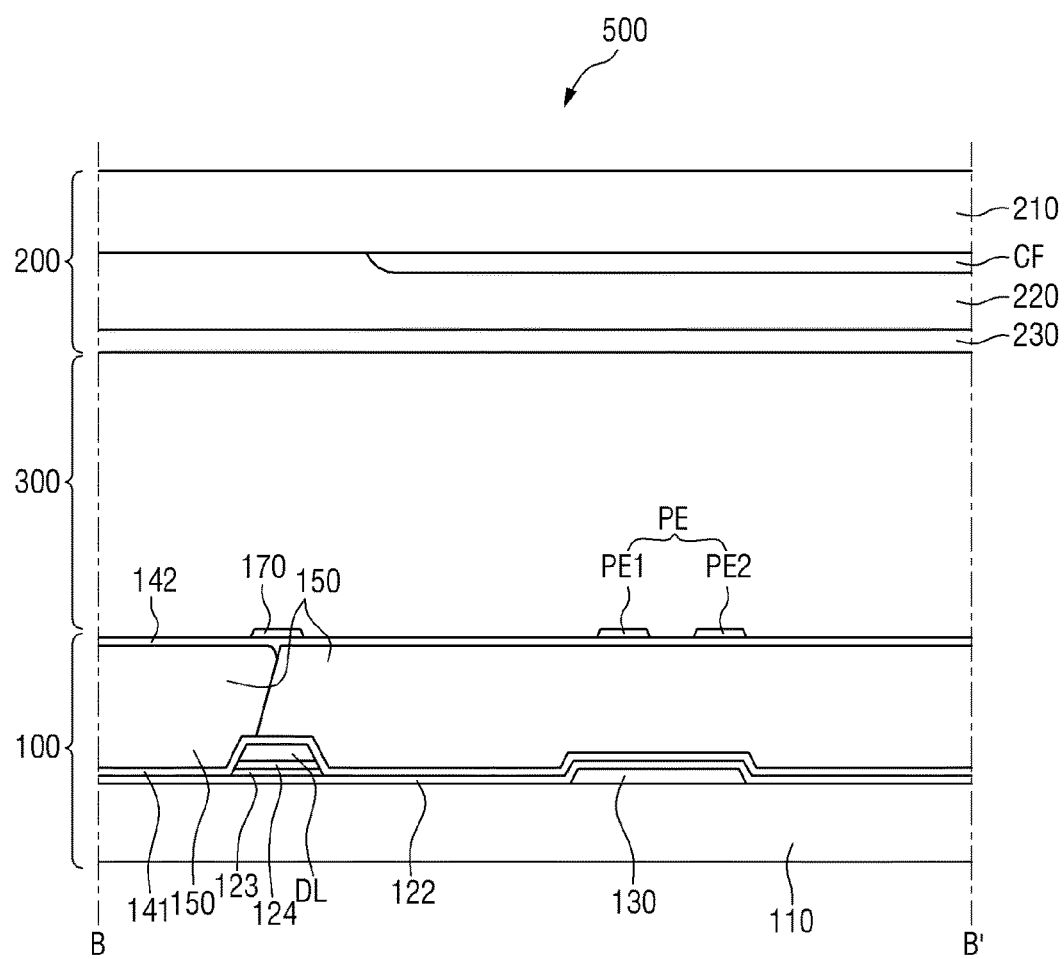
FIG. 4 is a schematic cross-sectional view taken along line B-B' of FIG. 2.

FIG. 2 is a schematic plan view of a pixel of a liquid crystal display according to an embodiment of the invention, FIG. 3 is a schematic cross-sectional view taken along line A-A' of FIG. 2, and FIG. 4 is a schematic cross-sectional view taken along the B-B' of FIG. 2.

Referring to FIG. 2, an exemplary embodiment of a pixel PX of the liquid crystal display 500 according to the invention may include a first pixel region PX1 and a second pixel region PX2. The first pixel region PX1 and the second pixel region PX2 may be divided by a pattern of the pixel electrode PE and a pattern of the storage electrodes 130 to be described later.

In an exemplary embodiment, as illustrated in FIGS. 3 and 4, the first substrate 100 may include a first insulating substrate 110 that may include or be formed of an insulating material such as a transparent glass, quartz, ceramic, silicon or a transparent plastic, for example. The first insulating substrate 110 may have flexibility in some embodiments.

The gate line GL and the gate electrode 121 may be disposed on the first insulating substrate 110. The gate line GL transfers the gate signals, and may extend mainly in a first direction (e.g., a horizontal direction). The gate electrode 121 may be defined by a protruded portion of the gate line GL. The gate line GL and the gate electrode 121 may have a multilayer structure which includes two conductive films (not illustrated) having different physical properties from each other. In one exemplary embodiment, for example, one conductive film may include or be made of a transparent conductive material, such as polycrystalline indium tin oxide ("ITO") or indium zinc oxide ("IZO"), and the other conductive film may include or be made of a material having high contact characteristics with ITO and IZO, e.g., a molybdenum-based metal, chromium, and titanium. In such an embodiment, the gate line GL and the gate electrode 121 may have a multilayer structure except the transparent conductive material. In one exemplary embodiment, for example, the multilayer structure of the gate line GL and the gate electrode 121 may include a chromium lower film and an aluminum upper film, or an aluminum lower film and a molybdenum upper film. In an exemplary embodiment, the gate line GL and the gate electrode 121 may have a single-layer structure including or made of a single metallic material. Such a single metallic material, for example, may include an aluminum-based metal such as aluminum (Al) and aluminum alloy, a silver-based metal such as silver (Ag) and silver alloy, a copper-based metal such as copper (Cu) and copper alloy, a molybdenum-based metal such as molybdenum (Mo) and molybdenum alloy, chromium (Cr), titanium (Ti) or tantalum (Ta). However, the gate line GL and the gate electrode 121 according to the invention are not limited thereto and may include or be formed of various other metals and conductors.

A gate insulating film 122 is disposed on the gate line GL and the gate electrode 121. The gate insulating film 122 may include or be made of an insulating material, and for example, may be made of silicon nitride (SiNx) or silicon oxide (SiO2).

A semiconductor layer 123 is disposed on the gate insulating film 122. The semiconductor layer 123 may at least partially overlap the gate electrode 121. The semiconductor layer 123 forms a thin film transistor TR, together with the gate electrode 121, the source electrode 125 and the drain electrode 126. The semiconductor layer 123, for example, may include or be made of hydrogenated amorphous silicon or polycrystalline silicon.

An ohmic contact layer 124 may be disposed on the semiconductor layer 123. The ohmic contact layer 124 is disposed under the lower semiconductor layer 123, an upper source electrode 125 to be described later and the drain electrode 126 to reduce the contact resistance. The ohmic contact layer 124, for example, may include or be made of n+hydrogenated amorphous silicon in which the n-type impurity is doped with high concentration. The ohmic contact layer 124 generally has the same shape as the semiconductor layer 123. However, the invention is not limited thereto. In some alternative embodiments, where the semiconductor layer 123 is an oxide semiconductor, the ohmic contact layer 124 may be omitted.

The data line DL, the source electrode 125 and the drain electrode 126 may be disposed on the ohmic contact layer 124 and the gate insulating film 122. The data line DL transmits the data voltage, and may be disposed to extend mainly in a second direction (e.g., a vertical direction) intersecting with or crossing the first direction to intersect with the gate line GL. The source electrode 125 is provided with the data voltage transmitted through the data line DL, and when the gate-on voltage is applied to the gate electrode 121, the thin film transistor TR is turned on. Thus, when the thin film transistor TR is turned on, the data voltage provided to the source electrode 125 is transmitted to the drain electrode 126, and the data voltage may be charged to the pixel electrode PE connected to the drain electrode 126. The source electrode 125 may be disposed to protrude upward from the gate electrode 121 and to at least partially overlap the gate electrode 121. The drain electrode 126 is disposed to at least partially overlap the gate electrode 121, and is disposed to be spaced apart from the source electrode 125. In such an embodiment, where the source electrode 125 and the drain electrode 126 are disposed to be spaced apart from each other, the ohmic contact layer 124 may be disposed in a way such that a portion of the ohmic contact layer 124 in contact with the source electrodes 125 and a portion of the ohmic contact layer 124 in contact with the drain electrode 126 are spaced apart from each other, and may exposed a part of the upper portion of the semiconductor layer 123 between the source electrode 125 and the drain electrode 126. In such an embodiment, a channel of the thin-film transistor TR is formed in a portion of the semiconductor layer 123 between the source electrode 125 and the drain electrode 126. The data line DL, the source electrode 125 and the drain electrode 126 may include or be made of a metallic material, for example, aluminum, silver, copper, molybdenum, chromium, titanium, tantalum or an alloy thereof.

A first protective layer 141 is disposed on the gate insulating film 122, the source electrode 125, the drain electrode 126, the partially exposed semiconductor layer 123 and the gate insulating film 122. A contact hole CT, which partially exposes the drain electrode 126, is defined through the first protective layer 141 to be electrically connected to the pixel electrode PE. The first protective layer 141 may include or be made of an organic insulating material or an inorganic insulating material.

An insulating layer 150 may be disposed on the first protective layer 141. The insulating layer 150 has a planarized surface and flattens a top of the first protective layer 141. The insulating layer 150 may include a photosensitive material. In an exemplary embodiment, the photosensitive material may be a photosensitive organic material, for example, a photoresist. The insulating layer 150 may further include a color pigment, through which only light of a particular color wavelength passes. In such an embodiment the insulating layer 150 may include a color filter CF disposed on the second substrate 200. In an exemplary embodiment, where the insulating layer 150 includes a color pigment, the color filter CF disposed on the second substrate 200 may be omitted. In an exemplary embodiment, the color pigment in the insulating layer 150 may include cyan, magenta, yellow or white color pigment, without being limited to three primary colors of red, green and blue. In such an embodiment, where the insulating layer 150 includes the color pigment, the insulating layer 150 may be disposed to at least partially overlap the insulating layer of the adjacent pixel on the top (e.g., a top surface) of the data line DL. A contact hole CT, which partially exposes the drain electrode 126 to be electrically connected to the pixel electrode PE, may be defined through the insulating layer 150.

A second protective layer 142 may be disposed on the insulating layer 150. The second protective layer 142 prevents the insulating layer 150 from rising and prevents the liquid crystal layer 300 from being contaminated by the organic materials, such as solvent introduced from the insulating layer 150. The second protective layer 142 may include or be made of an inorganic insulating material such as silicon oxide, silicon nitride and silicon oxynitride, for example. The contact hole CT, which partially exposes the drain electrode 126 to be electrically connected to the pixel electrode PE, is further defined though the second protective layer 142.

The pixel electrode PE may be disposed on the second protective layer 142. The pixel electrode PE may be electrically connected to the thin film transistor TR, by being disposed to contact the drain electrode 126 through the contact hole CT in the first protective layer 141, the insulating layer 150 and the second protective layer 142. Thus, when the gate electrode 121 receives the application of the gate-on signal and the channel is formed in the semiconductor layer 123, the thin film transistor TR is turned on, the data voltage applied through the source electrode 125 is provided to the drain electrode 126, and the data voltage thus provided is transmitted to the pixel electrode PE through the contact hole CT to charge the data voltage. An electric field is generated by a potential difference between voltage charged to the pixel electrode PE, that is, the pixel voltage, and the voltage of the common electrode 230 disposed on the second substrate 200, that is, the common voltage, thereby rearranging the liquid crystal molecules of the liquid crystal layer 300. The pixel electrode PE may include or be made of a transparent conductive material such as polycrystalline ITO or IZO.

As illustrated in FIG. 2, the pixel electrode PE may include a cross-shaped stem PEa, and a plurality of branches PEb connected to the stem PEa and spaced apart from each other. FIG. 2 shows an embodiment where the stem PEa has a cross shape, but not being limited thereto. In an exemplary embodiment, the pixel PX may have a plurality of domains by the stem PEa. In one exemplary embodiment, for example, a pixel PX has four domains as shown in FIG. 2. In such an embodiment, the plurality of branches PEb is disposed to be spaced apart from one another, and the branches PEb in a same region of the region divided by the stem PEa may extend in a direction substantially parallel to one another. The branches PEb of the pixel electrode PE correspond to each domain defined by the stem PEa, and the liquid crystal molecules may be aligned in the different directions for each domain. The branches PEb adjacent to each other may be spaced apart from each other at a distance of micrometers. The branches PEb may align the liquid crystal molecules of the liquid crystal layer 300 at a specific azimuthal angle on a plane parallel to the first insulating substrate 110.

In an exemplary embodiment, a pixel PX includes domains, the number of which depends on whether the pixel electrode PE overlaps a storage electrode 130 to be described later. In such an embodiment, referring to FIG. 2, in the pixel PX divided into four domains by the stem PEa, each domain of the pixel PX may further have the first pixel region PX1 and the second pixel region PX2. In such an embodiment, the pixel PX of FIG. 2 may have eight domains. Thus, the pixel electrode PE may include patterns 161, 162 of the first pixel electrode PE1 disposed to overlap the patterns of the storage electrode 130, and patterns 163 and 164 of the second pixel electrode PE2 disposed not to overlap the pattern of the storage electrode 130 such that the alignment direction of the liquid crystal molecules aligned on the first pixel electrode PE1 and the alignment direction of the liquid crystal molecules disposed on the second pixel electrode PE2 are controlled differently from each other. In such an embodiment, the liquid crystal molecules rotate by a voltage difference between the pixel electrode PE and the common electrode 230, and the liquid crystal molecules rotate again by a voltage difference between the data voltage applied to the patterns 161, 162 of the first pixel electrode PE1 and the storage voltage applied to the pattern of the storage electrodes 130. Thus, when only the stem PEa and the plurality of branches PEb of the pixel electrode PE are included, the pixel may have only four domains. In an exemplary embodiment of the invention, the liquid crystal display 500 may further include the first pixel region PX1 and the second pixel region PX2 for each domain, depending on whether the patterns of the pixel electrode PE 130 overlap the pattern of the storage electrode, such that the pixel may include more domains. Although the pixel is illustrated to have the eight domains in FIG. 2, the invention is not limited thereto. In an alternative exemplary embodiment, where the overlap regions between the pattern of the storage electrode 130 and the pattern of the pixel electrode PE are differently formed, for example, when forming to overlap in a stepping-stone form, the pixel may have more domains.

In an exemplary embodiment, a storage line SL may be further disposed on the first insulating substrate 110. The storage line SL extends substantially in the same direction as the gate line GL, for example, in the first direction, and may protrude in the second direction from the first direction and may extend substantially in the same direction as the data line DL. The storage line SL may further include a storage electrode 130 disposed in a region which overlaps the pixel electrode PE. The storage electrode 130 may be disposed on or in the same layer as the gate electrode 121. Thus, in some embodiments, the storage electrode 130 may be provided or formed in the same process as the gate electrode 121, using a single mask. In an exemplary embodiment, the storage electrodes 130 is disposed to overlap some patterns 161, 162 of the pixel electrode PE when viewed in plane, and the storage electrodes 130 may include or be made of the same material as the pixel electrode PE. In one exemplary embodiment, for example, the storage electrode 130 may include or be made of a transparent conductive material, such as polycrystalline ITO or IZO. In such an embodiment, since the storage electrode 130 is formed of a transparent conductive material, the aperture ratio of the liquid crystal display 500 may be improved. In such an embodiment, since the storage electrode 130 may not be formed at a position which overlaps the pixel electrode PE, that is to say, since there is a limit to increase the area of the storage electrodes 130, there is a limit to improve the characteristics of a key-back voltage of the liquid crystal display 500. In an exemplary embodiment of the invention, since the storage electrode 130 may be formed of a transparent conductive material and there is no limit to expand the storage electrode 130, it is possible to improve the characteristics of the key-back voltage of the liquid crystal display 500.

In an exemplary embodiment of the liquid crystal display 500 according to the invention, a shielding electrode 170 may be further disposed on the second protective layer 142. The shielding electrode 170 may be disposed to be physically spaced apart from the pixel electrode PE and may be disposed in or directly on the same layer as the pixel electrode PE. In such an embodiment, the shielding electrode 170 may be disposed in direct contact with the second protective layer 142, similarly to the pixel electrode PE. Since the voltage, which is substantially the same as the common electrode 230, is transmitted to the shielding electrode 170 through a separate terminal, the liquid crystal molecules disposed between the common electrode 230 and the shielding electrode 170 may be disposed in a vertical direction with respect to the first insulating substrate 110. Thus, the shielding electrode 170 may effectively prevent the influence on the adjacent pixels due to the light-leakage caused by the light transmission of the liquid crystal molecules rearranged by an electric field between the pixel electrode PE and the common electrode 230. However, it is not limited thereto, and in an alternative exemplary embodiment, the voltage, which is the same as the voltage applied to the storage electrode 130, may be applied to the shielding electrode 170. In such an embodiment, the voltage difference between the common voltage and the storage voltage is not substantially large. The shielding electrode 170 may be disposed to overlap the thin film transistor TR or the data line DL when viewed in plane.

The second substrate 200 may include a second insulating substrate 210, a color filter CF, an over-coating layer 220 and a common electrode 230. In an exemplary embodiment, where the shielding electrode 170 plays the role of the vertical light-leakage prevention, a shield pattern (not illustrated) which plays the role of the horizontal light-leakage prevention may be further disposed on the second substrate 200.

The second insulating substrate 210 may include or be formed of an insulating material, such as a transparent glass, quartz, ceramic, silicon or a transparent plastic, for example. The second insulating substrate 210 may have flexibility in some embodiments.

A color filter CF may be disposed on the second insulating substrate 210, and more particularly, on a surface facing the first insulating substrate 110. The color filter CF may be made up of an organic film including pigment or dye which displays each color. However, as described above, in an exemplary embodiment, where the insulating film 150 disposed on the first insulating substrate 110 includes a color pigment, the color filter CF may be omitted.

The over-coating layer 220 may be disposed on the color filter CF. The over-coating layer 220 serves to flatten a step formed by the color filter CF. The over-coating layer 220 may include or be formed of a transparent organic film, and in another embodiment, it may be omitted.

The common electrode 230 may be disposed on the over-coating layer 220. The common electrode 230 may generate an electric field together with the pixel electrode PE disposed on the first substrate 100, by receiving the common voltage. The common electrode 230, for example, may include or be made of a transparent conductive material such as ITO or IZO. In an exemplary embodiment, as shown in FIGS. 3 and 4, the common electrode 230 is generally formed over the whole surface of the second insulating substrate 210 regardless of the pixels PX, but not being limited thereto.

Figure 5:
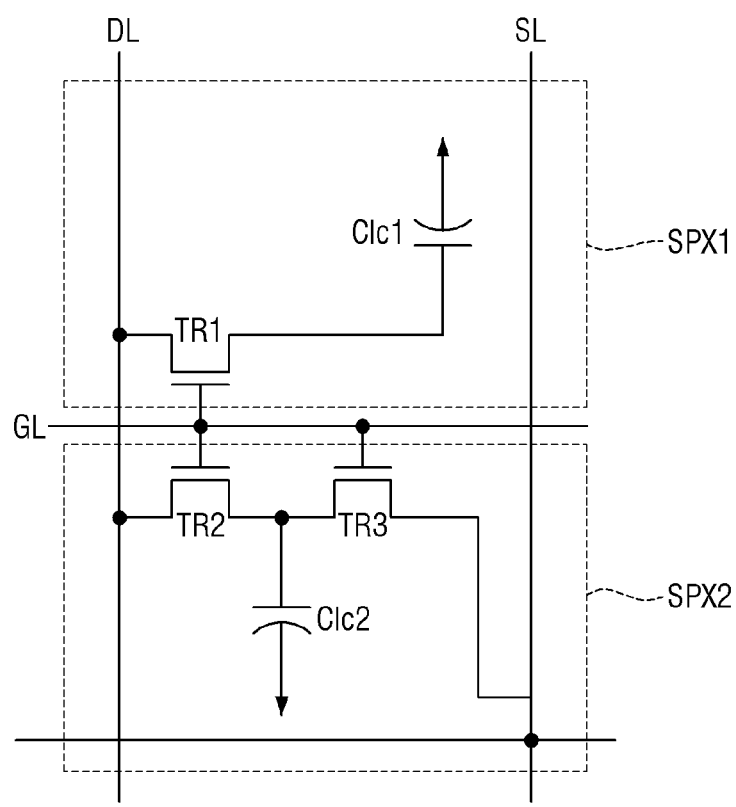
FIG. 5 is a schematic equivalent circuit diagram of an alternative embodiment of a pixel of a liquid crystal display according to the invention.
Figure 6:
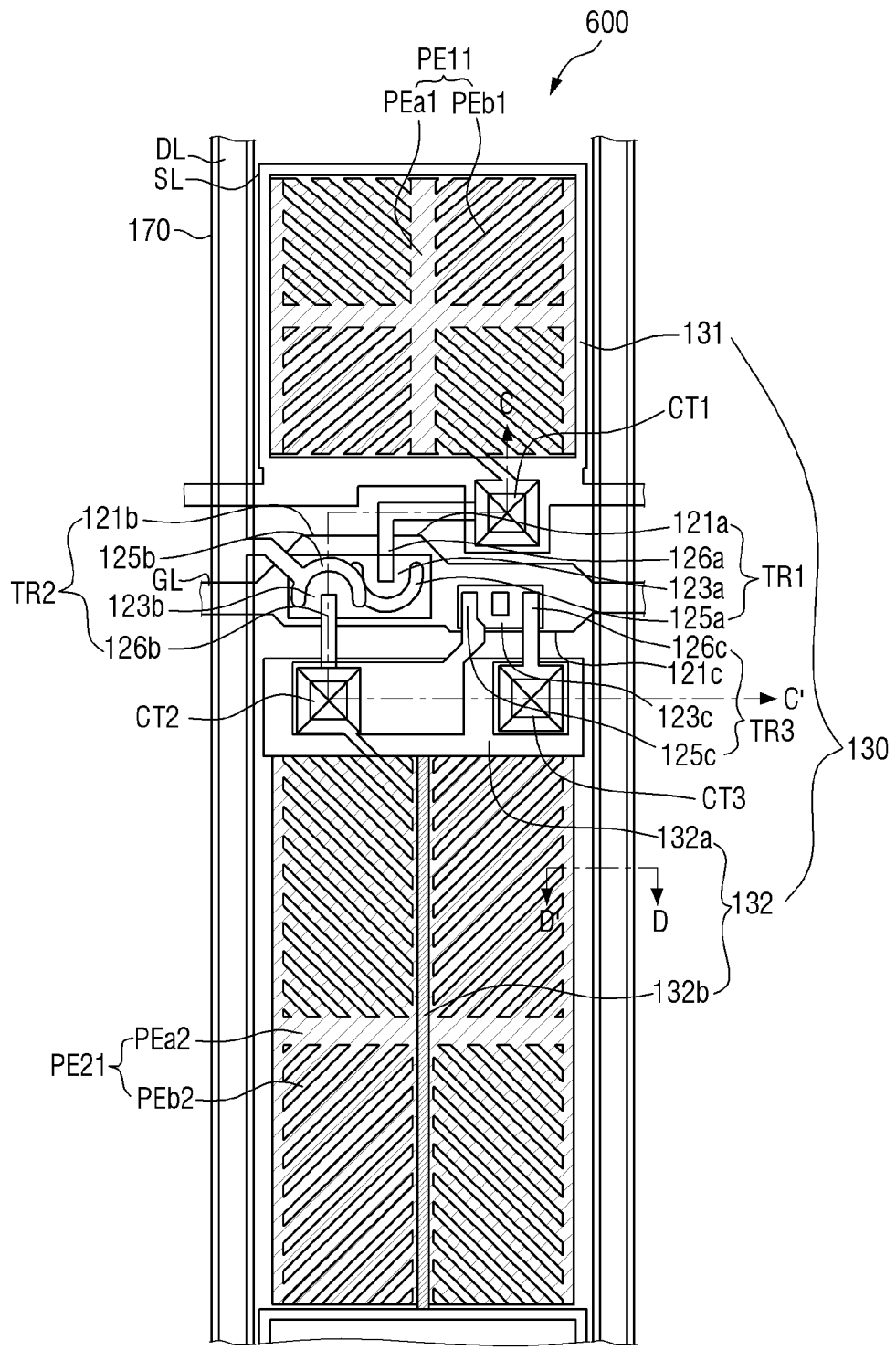
FIG. 6 is a schematic plan view of a pixel of a liquid crystal display according to an alternative embodiment of the invention.
Figure 7:
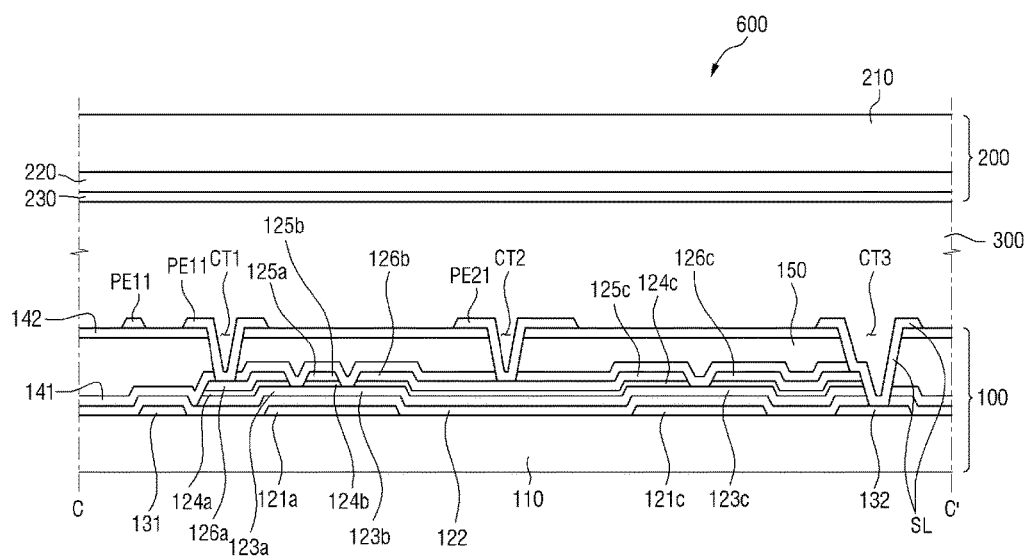
FIG. 7 is a schematic cross-sectional view taken along line C-C' of FIG. 6.
Figure 8:
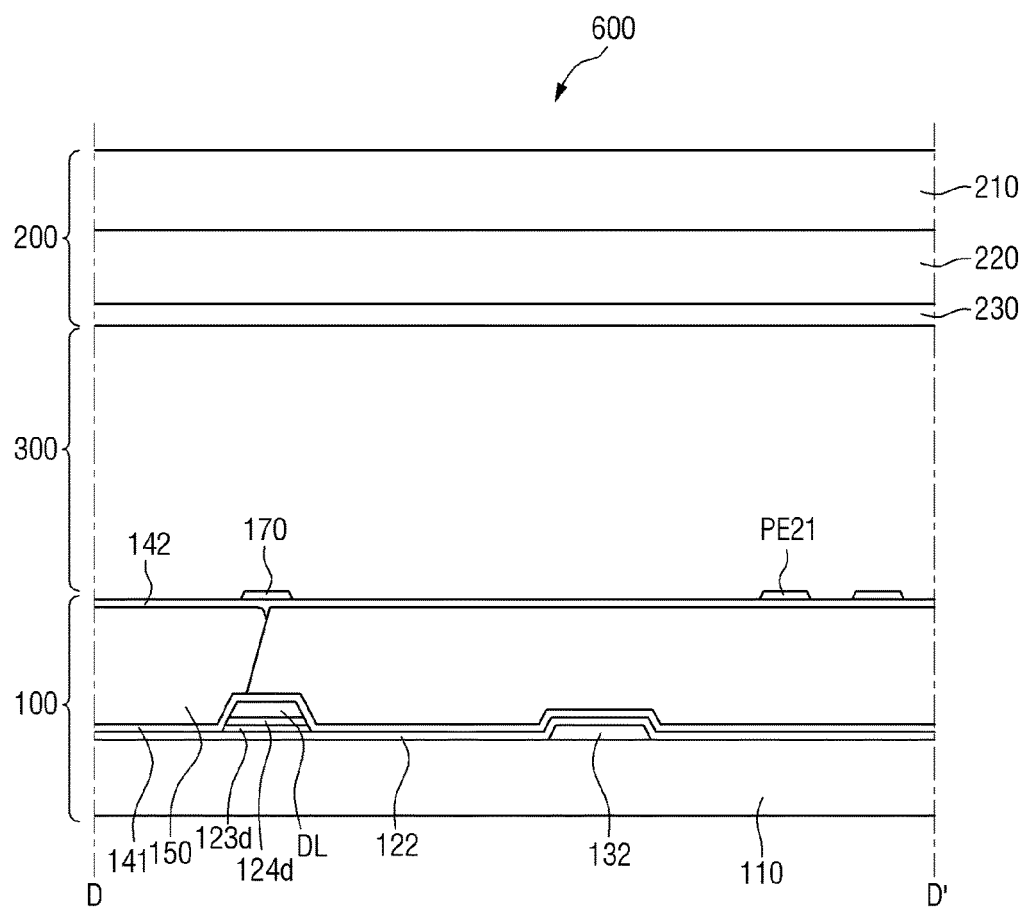
FIG. 8 is a schematic cross-sectional view taken along line D-D' of FIG. 6.

FIG. 5 is a schematic equivalent circuit diagram of a pixel of a liquid crystal display according to an alternative embodiment of the invention, FIG. 6 is a schematic plan view of an alternative embodiment of a pixel of a liquid crystal display according to the invention, FIG. 7 is a schematic cross-sectional view taken along line D-D' of FIG. 6, and FIG. 8 is a schematic cross-sectional view taken along line the line C-C' of FIG. 6.

In FIGS. 5 to 8, the same components as the embodiments described above have been labeled with the same reference characters as used above, and any repetitive detailed description thereof will hereinafter be omitted or simplified.

Referring to FIGS. 5 to 8, an exemplary embodiment of a liquid crystal display 600 may include a first substrate 100, a second substrate 200, and a liquid crystal layer 300 interposed between the first substrate 100 and the second substrate 200. In such an embodiment, a pixel of the liquid crystal display 600 may include two sub-pixels SPX1, SPX2. First and the second sub-pixel electrodes PE11, PE21 are disposed in the two sub-pixels SPX1, SPX2, respectively, and the first and the second sub-pixel electrodes PE11, PE21 may include first and second stems PEa1, PEa2 having a cross shape, and a plurality of branches PEb1, PEb2 which are connected to the first and second stems PEa1, PEa2 and are spaced apart from each other.

Referring first to FIG. 5, in an exemplary embodiment, a pixel PX of the liquid crystal display 600 may include a gate line GL which transmits a gate signal, a data line DL which transmits a data signal or a voltage, a storage line SL to which a constant storage voltage is applied, a first thin film transistor TR1, a second thin film transistor TR2 and a third thin film transistor TR3. In such an embodiment, the pixel PX of the liquid crystal display 600 may include a first sub-pixel SPX1 located in an upper region, and a second sub-pixel SPX2 located in a lower regions with respect to the gate line GL, when viewed from a plan view.

The first sub-pixel SPX1 may include a first thin film transistor TR1 and a first liquid crystal capacitor Clc1. A first terminal of the first thin film transistor TR1 is connected to the gate line GL, a second terminal of the first thin film transistor TR1 is connected to the data line DL, and a third terminal of the first thin film transistor TR1 is connected to the first liquid crystal capacitor Clc1.

The second sub-pixel SPX2 may include a second thin film transistor TR2, a third thin film transistor TR3 and a second liquid crystal capacitor Clc2. A first terminal of the second thin film transistor TR2 is connected to the same gate line GL connected to the first thin film transistor TR1, a second terminal of the second thin film transistor TR2 is connected to the same data line DL connected to the first thin film transistor TR1, and a third terminal of the second thin film transistor TR2 is connected to the second liquid crystal capacitor Clc2. The first terminal of the third thin film transistor TR3 is connected to the same gate line GL to which the first thin film transistor TR1 and the second thin film transistor TR2 are connected, the second terminal is connected to the storage line SL, and the third terminal is connected to the third terminal of the second thin film transistor TR2.

The operation of such an embodiment of the pixel of the liquid crystal display 600 will be briefly described. When a gate-on voltage is applied to the gate line GL, all the first to third thin film transistors TR1, TR2, TR3 connected thereto are in a turn-on state, and the first liquid crystal capacitor Clc1 and the second liquid crystal capacitor Clc2 are charged by the data voltage transmitted through the data line DL. When the gate-on voltage is applied to the gate line GL, the data voltages applied to the first sub-pixel electrode PE11 and the second sub-pixel electrode PE21 are identical to each other, and the first liquid crystal capacitor Clc1 and the second liquid crystal capacitor Clc2 are charged with a same amount of change corresponding to a difference between the common voltage and the data voltage.

At the same time, since the third thin film transistor TR3 is turned on, the voltage transmitted to the second sub-pixel electrode PE21 through the data line DL is divided through the third thin film transistor TR3 connected in series with the second thin film transistor TR2. At this time, the voltage is divided depending on the sizes of the channels of the second thin film transistor TR2 and the third thin film transistor TR3, because the storage voltage lower than the data voltage is applied through the third thin film transistor TR3. Although the magnitude of the storage voltage is the same as common voltage or may be slightly higher than the level of the common voltage, the difference may not be large. Therefore, even if the voltage charged to the first sub-pixel electrode PE11 and the second sub-pixel electrode PE21 through the data line DL is the same, the magnitude of the voltages charged to the first liquid crystal capacitor Clc1 and the second liquid crystal capacitor Clc2 may change.

Thus, the voltage charged to first and second sub-pixels PX1, PX2 in a pixel PX may be changed, such that the side visibility is improved. In such an embodiment, as described above with reference to FIG. 2, when the pattern of the storage electrode 130 and the pattern of the pixel electrode PE are disposed to overlap each other on the second sub-pixel PX2 so that the different voltages are charged depending on the voltage difference, the pixel has more domains, and the side visibility of the liquid crystal display may be further improved.

Next, referring to FIGS. 6 to 8, the structure of the liquid crystal display 600 according to another alternative embodiment of the invention will be described in greater detail.

In an exemplary embodiment, a gate line GL which receives the application of the gate signal may be disposed on the first insulating substrate 110 of the first substrate 100.

A first gate electrode 121a and a second gate electrode 121b protruding from the gate line GL and connected to each other, and a third gate electrode 121c spaced apart from the first gate electrode 121a and the second gate electrode 121b may be disposed on the first insulating substrate 110. The first to third gate electrodes 121a, 121b, 121c are connected to the same gate line GL, and the same gate signal may be applied thereto.

A gate insulating film 122 may be disposed on the gate line GL, and the first to third gate electrodes 121a, 121b, 121c.

First to fourth semiconductor layers 123a, 123b, 123c, 123d may be disposed on the gate insulating film 122. The first semiconductor layer 123a may be disposed on the first gate electrode 121a, the second semiconductor layer 123b may be disposed on the second gate electrode 121b, the third semiconductor layer 123c may be disposed on the third gate electrode 121c, and the fourth semiconductor layer 123d may be disposed on the gate insulating film 122.

First to fourth ohmic contact layers 124a, 124b, 124c, 124d may be disposed on the first to fourth semiconductor layers 123a, 123b, 123c, 123d. In an exemplary embodiment, where the first to fourth semiconductor layers 123a, 123b, 123c, 123d are oxide semiconductors, the first to fourth ohmic contact layers 124a, 124b, 124c, 124d may be omitted.

A data line DL, first to third source electrodes 125a, 125b, 125c and first to third drain electrodes 126a, 126b, 126c may be disposed on the first to fourth ohmic contact layers 124a, 124b, 124c, 124d and the gate insulating film 122.

The data line DL transmits the data voltage, and extends mainly in the second direction (e.g., the vertical direction) to intersect with the gate line GL.

The first and second source electrodes 125a, 125b may protrude from the data line DL.

The first and second drain electrodes 126a, 126b may be disposed to be spaced apart from the first source electrode 125a and the second source electrode 125b on each of the first gate electrode 121a and the second gate electrode 121b. The separated space may form a channel on the first and second semiconductor layers 124a, 124b. In an exemplary embodiment, the first gate electrode 121a, the first semiconductor layer 123a, the first source electrode 125a and the first drain electrode 126a collectively define a first thin film transistor TR1. In such an embodiment, the second gate electrode 121b, the second semiconductor layer 123b, the second source electrode 125b and the second drain electrode 126b collectively define a second thin film transistor TR2.

The third source electrode 125c is connected to the second drain electrode 126b, and may be disposed to be spaced apart from the third drain electrode 126c over the third gate electrode 121c. A space between the third source electrode 125c and the third drain electrode 126c spaced apart from each other may form a channel on the third semiconductor layer 124c. In such an embodiment, the third gate electrode 121c, the third semiconductor layer 123c, the third source electrode 125c and the third drain electrode 126c collectively define a third thin film transistor TR3.

The third drain electrode 126c may protrude upward from the third gate electrode 121c. The third drain electrode 126c may be connected to the storage line SL to receive the application of the storage voltage.

A first protective layer 141 may be disposed on the data line DL, the first to third source electrodes 125a, 125b, 125c and the first to third drain electrodes 126a, 126b, 126c. An insulating layer 150 may be disposed on the first protective layer 141, and a second protective layer 142 may be disposed on the insulating layer 150.

A first contact hole, CT1 which partially the first drain electrode 126a, and a second contact hole CT2, which partially exposes the second drain electrode 126b, may be defined through the first protective layer 141, the insulating layer 150 and the second protective layer 142.

A pixel electrode PE may be disposed on the insulating layer 150 and the second protective layer 142. The pixel electrode PE may include a first sub-pixel electrode PE11 and a second sub-pixel electrode PE21. The first sub-pixel electrode PE11 may be connected to the first drain electrode 126a through the first contact hole CT1, and the second sub-pixel electrode PE21 may be connected to the second drain electrode 126b through the second contact hole CT2.

Each of the first sub-pixel electrode PE11 and the second sub-pixel electrode PE21 receives the data voltage through the first drain electrode 126a and the second drain electrode 126b. Some of the data voltage applied to the second drain electrode 126b is divided through the third source electrode 125c, and the magnitude of the second sub-pixel voltage applied to the second sub-pixel electrode PE21 becomes smaller than the magnitude of the first sub-pixel voltage applied to the first pixel electrode PE11 when the data voltage applied to the first sub-pixel electrode PE11 and the second sub-pixel electrode PE21 has positive polarity (+). When the data voltage applied to the first sub-pixel electrode PE11 and the second sub-pixels electrode PE21 has negative polarity (−), the first sub-pixel voltage applied to the first sub-pixel electrode PE11 becomes smaller than the second sub-pixel voltage applied to the second sub-pixel electrode PE21.

The first sub-pixel electrode PE11 may include a first stem PEa1, and a plurality of first branches PEb1 extending to obliquely protrude from the first stem PEa1. In an exemplary embodiment, as illustrated in FIG. 6, the first sub-pixel SPX1 may have four domains defined based on the extending directions of the first stem PEa1 of the first sub-pixel electrode PE11. The first branches PEb1 in a same domain may extend in a direction and the first branches PEb1 in different domains may extend in different directions for each other. The first branches PEb1 in a same domain may be disposed to extend parallel to each other and to be spaced apart from each other. The first branches PEb1 adjacent to each others are spaced apart from each other at a distance of micrometers, and may define a plurality of fine slits. The first sub-pixel electrode PE11 may include or be formed of a transparent conductive material. The liquid crystal molecules of the liquid crystal layer 300 of the first sub-pixel SPX1 are tilted in different directions for each domain by the plurality of fine slits of the first sub-pixel electrode PE11. In one exemplary embodiment, for example, the tilted direction of the liquid crystal molecules may be four directions towards the first stem PEa1. Therefore, the four domains in which orientations of the liquid crystal molecules are different from each other may be defined in the liquid crystal layer 300. In such an embodiment, where the tilted directions of the liquid crystal molecules are differently set in the domains, the reference viewing angle of the liquid crystal display 600 including the liquid crystal layer 300 may increase.

The second sub-pixel electrode PE21 may include a second stem PEa2, and a plurality of second branches PEb2 extending to obliquely protrude from the second stem PEa2. In such an embodiment, the structure of the second sub-pixel electrode PE21 is substantially the same as the structure of the first sub-pixel electrode PE11 described above except that the area of the second sub-pixel electrode PE21 may be greater than the area of the first sub-pixel electrode PE11 when viewed in plan. In an exemplary embodiment, as illustrated in FIG. 2, when the second sub-pixel electrode PE21 is disposed in a way such that some of the second sub-pixel electrode PE21 partially overlaps the pattern of the second storage electrode 132 below the second sub-pixel electrode PE21 to be described later, the second sub-pixel electrode may have more domains by the difference between the data voltage of the second sub-pixel electrode PE21 and the storage voltage of the second storage electrode 132 disposed to overlap the second sub-pixel electrode PE21. In such an embodiment, although the second sub-pixel electrode PE21 illustrated in FIG. 6 has four domains by the second stem PEa2, some of the pattern of the second sub-pixel electrode PE21 partially overlaps the pattern of the second storage electrode 132, such that the second sub-pixel electrode may have more domains than four domains.

In an exemplary embodiment, the storage line SL may be further disposed on the first insulating substrate 110. The storage line SL may include a first storage electrode 131 and a second storage electrode 132. In such an embodiment, as illustrated in FIG. 2, the first storage electrode 131 and the second storage electrode 132 may be disposed to overlap the pattern of the pixel electrode PE. In such an embodiment, the width of the interval between the first storage electrode 131 and the second storage electrode 132 may be widened as compared to the related art. In the related art, since the first storage electrode 131 and the second storage electrode 132 are formed of a metallic material, the first storage electrode 131 and the second storage electrode 132 does not disposed in a transmitting region. However, in an exemplary embodiment, the first storage electrode 131 and the second storage electrode 132 includes or are formed of a transparent conductive material, the first storage electrode 131 and the second storage electrode 132 may be variously disposed without being limited to the transmitting region and the non-transmitting region. Here, the transmitting region refers to a region in which the pixel electrode PE and the common electrode 230 overlap with the each other to align the liquid crystal molecules, and the non-transmitting region refers to a region in which the thin film transistors TR1, TR2, TR3 are disposed.

The first storage electrode 131 may be disposed to partially surround the first sub-pixel electrode PE11. More specifically, as illustrated in FIG. 6, the first storage electrode 131 may be disposed between the first sub-pixel electrode PE11 and the data line DL and between the first sub-pixel electrode PE21 and the gate line GL. In an exemplary embodiment, as illustrated in FIG. 7, the first storage electrode 131 may be disposed in or directly on the same layer as the first to third gate electrodes 121a, 121b, 121c and may include or be formed of a transparent conductive material.

The second storage electrode 132 may include a first storage electrode portion 132a disposed substantially in the same direction (e.g., a horizontal direction) as the gate line SL, and a second storage electrode portion 132b disposed to overlap the vertical portion of the cross shape of the second stem PEa21 of the second sub-pixel electrode 132 to increase the capacitance of the second storage electrode PE2. In an exemplary embodiment, as illustrated in FIGS. 7 and 8, the second storage electrode 132 may be disposed in or directly on the same layer as the first to third gate electrodes 121a, 121b, 121c and may include or be formed of a transparent conductive material. However, the invention is not limited thereto, and in some embodiments, the second storage electrode 132 may include or be formed of a transparent conductive material, and in some embodiments, the second storage electrode 132 may be formed by laminating a metallic material having a width smaller than the transparent conductive material. The structure will be described below in greater detail.

A shielding electrode 170 may be further disposed on the second protective layer 142 disposed on the first insulating substrate 110. In an exemplary embodiment, as illustrated in FIG. 8, the shielding electrode 170 is disposed to be physically spaced apart from the second sub-pixel electrode PE21 and may be disposed in or directly on the same layer as the second sub-pixel electrode PE21. In such an embodiment, similarly to the second sub-pixel electrode PE, the shielding electrode 170 may be in direct contact with the second protective layer 142. In such an embodiment, substantially the same voltage as the common electrode 230 is transmitted to the shielding electrode 170 through another terminal, such that the liquid crystal molecules disposed between the common electrode 230 and the shielding electrode 170 may be aligned in the vertical direction with respect to the first insulating substrate 110. Thus, the shielding electrode 170 may play a role of light-leakage prevention. However, the invention is not limited thereto, and alternatively, the same voltage as the voltage applied the storage electrodes 130 may be applied to the shielding electrode 170. In such an embodiment, the voltage difference between the common voltage and the storage voltage is not substantially large. The shielding electrode 170 may be disposed to overlap the thin film transistor TR or a data line DL, when viewed in plan.

The second substrate 200 may include a second insulating substrate 210, an over-coating layer 220 and a common electrode 230. In an exemplary embodiment, where the first shielding electrode 170 plays the role of the vertical light-leakage prevention, the second substrate 200 may further include the shield pattern (not shown) which plays the role of the horizontal light-leakage prevention. In an exemplary embodiment, where the insulating layer 150 formed on the first insulating substrate 110 does not include a color pigment, a color filter is disposed on the second insulating substrate 210. In such an embodiment, the second substrate 200 is the same as that described above with reference to FIGS. 2 to 4, and any repetitive detailed description will be omitted.

Figure 9:
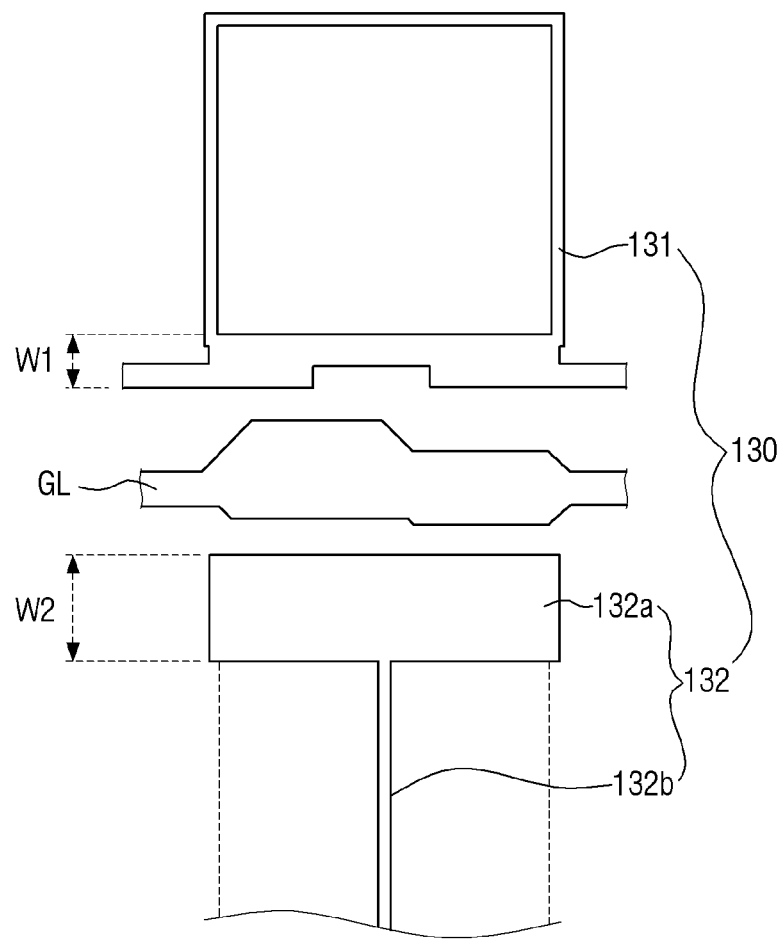
FIG. 9 is a schematic plan view of a gate line and a storage electrode in a pixel of a liquid crystal display according to another alternative embodiment of the invention.
Figure 10:
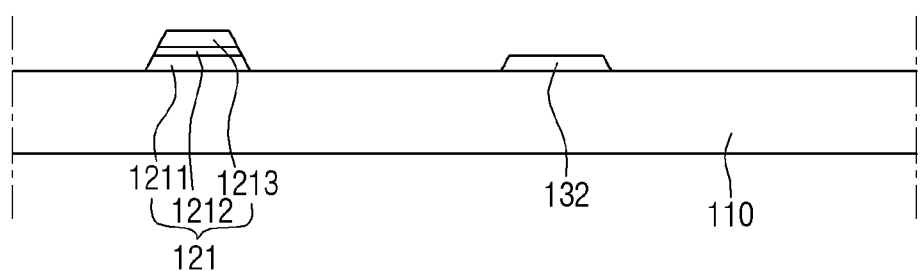
FIG. 10 is a schematic cross-sectional view of FIG. 9.
Figure 11:
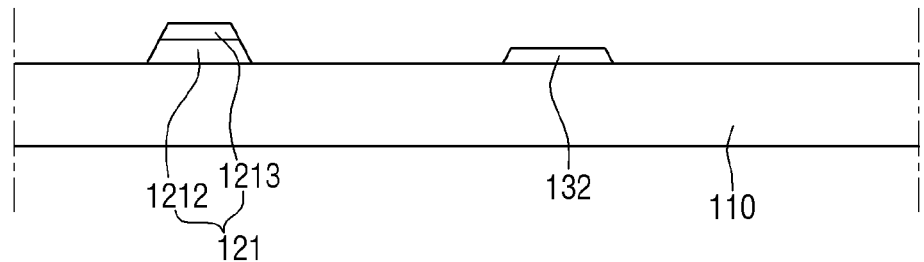
FIG. 11 is a schematic cross-sectional view of FIG. 9.
Figure 13:
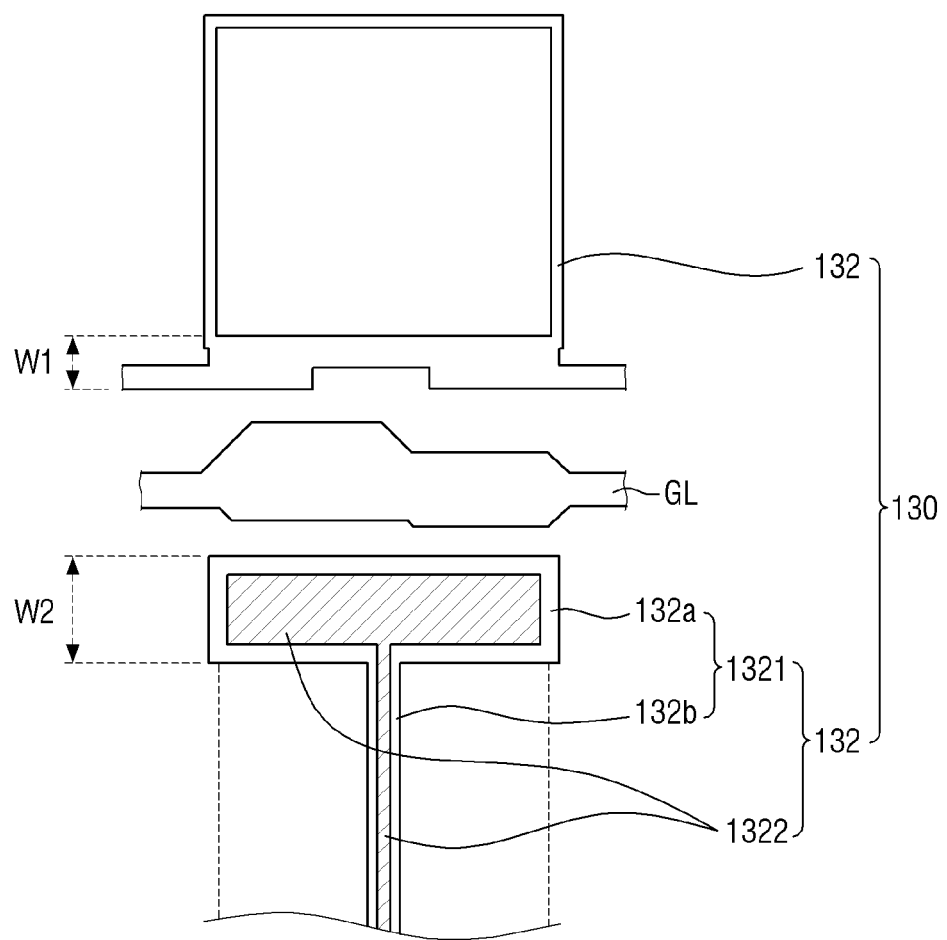
FIG. 13 is a schematic plan view of a gate line and a storage electrode in a pixel of a liquid crystal display according to another alternative embodiment of the invention.
Figure 14:
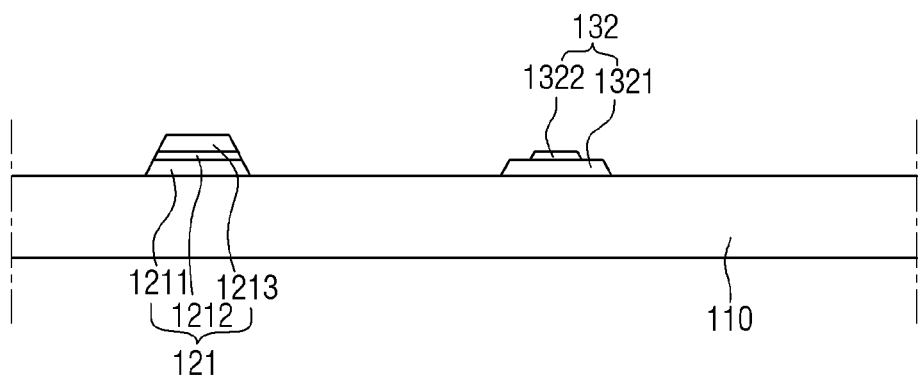
FIG. 14 is a schematic cross-sectional view of FIG. 13.

FIG. 9 is a schematic plan view of the gate line and the storage electrode in a pixel of a liquid crystal display according to another alternative embodiment of the invention. FIG. 10 is a schematic cross-sectional view of FIG. 9, FIG. 11 is a schematic cross-sectional view of FIG. 9, FIG. 12 is a schematic plan view of the gate line and the storage electrode in a pixel of a liquid crystal display according to another embodiment of the invention, FIG. 13 is a schematic plan view the gate line and the storage electrode in a pixel of a liquid crystal display according to another embodiment of the invention, and FIG. 14 is a schematic cross-sectional view of FIG. 13.

FIG. 9 shows the first storage electrode 131, the gate line GL and the second storage electrode 132 of the liquid crystal display 600 according to another embodiment of the invention as illustrated in FIG. 6. In such an embodiment, the first storage electrode 131 may be disposed to have a first width W1, and the second storage electrode 132 may be disposed to have a second width W2.

In an exemplary embodiment, the storage capacitance may be increased by the second storage electrode 132 that overlaps the vertical portion of the second stem PEa2 of the second sub-pixel electrode PE21. Thus, by preventing an increase in kick-back voltage of the third thin film transistor TR3 electrically connected to the second sub-pixel electrode PE21, a decrease in display quality due to the kick-back voltage difference between the first sub-pixel electrode PE11 and the second sub-pixel electrode PE21 may be effectively prevented.

Figure 12:
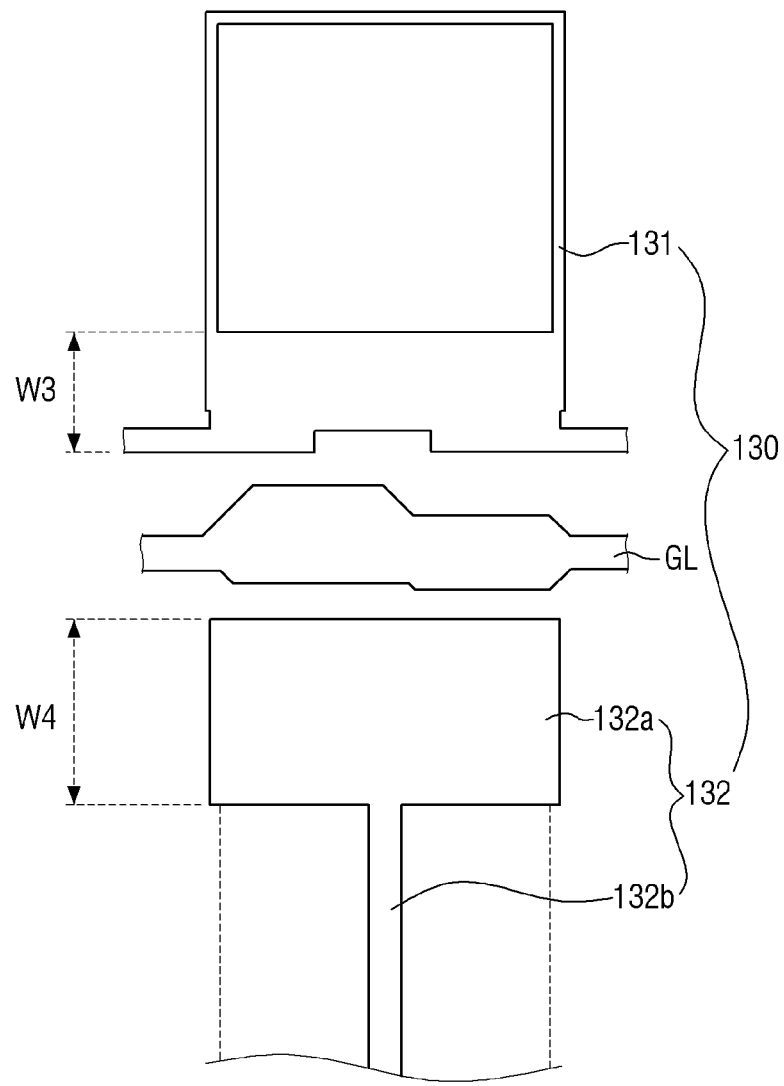
FIG. 12 is a schematic plan view of a gate line and a storage electrode in a pixel of a liquid crystal display according to another alternative embodiment of the invention.

In an exemplary embodiment, to increase the capacity of the storage electrode 130 to further prevent a decrease in display quality due to the kick-back voltage difference, as illustrated in FIG. 12, the first storage electrode 131 may have a third width W3 wider than the first width W1, and the second storage electrode 132 may have a fourth width W4 wider than the second width W2. In such an embodiment, the width of the second storage electrode portion 132b of the second storage electrode 132 overlapping the vertical portion of the second stem PEa2 of the second sub-pixel electrode PE21 may be wider than that illustrated in FIG. 9 since the first and second storage electrodes 131, 132 includes or are formed of a transparent conductive material. In such an embodiment, when the region overlapping the first sub-pixel electrode PE11 or the second sub-pixel electrode PE21 occurs by the wide widths of the first and second storage electrodes 131, 132, as described above, the liquid crystal molecules may be controlled to be disposed in the different directions, more domains may be defined in each pixel, and thus, the visibility of the liquid crystal display 600 may be further improved.

In exemplary embodiments, as described above, the storage electrode 130 may be formed in the same process as the gate electrode 121 formed to protrude from the gate line GL as shown in FIGS. 10 and 11.

FIG. 10 is a cross-sectional view showing a process of forming the gate electrode 121 and the second storage electrode 132, using a single mask. Although not shown in FIG. 10, the first storage electrode 131 may also be formed together with the gate electrode 121 and the second storage electrode 132 in the same process.

Referring to FIG. 10, the gate electrode 121 may include a first gate layer 1211 including or made of a transparent conductive material, for example, a material such as ITO or IZO, a second gate layer 1212 which may include or be made of one of molybdenum-based metal, chromium, and titanium having high contact characteristics with the first gate layer 1211, and a third gate layer 1213 which may include or be made of a metallic material, for example, an aluminum-based metal such as aluminum (Al) and aluminum alloy, a silver-based metal such as silver (Ag) and silver alloy, a copper-based metal such as copper (Cu) and copper alloy, a molybdenum-based metal such as molybdenum (Mo) and molybdenum alloy, chromium (Cr), titanium (Ti) or tantalum (Ta). In an exemplary embodiment, the second storage electrode 132 may include or be formed of a single layer including or made of the transparent conductive material which is the same material as the first gate layer 1211, for example, ITO or IZO. In such an embodiment, after the transparent conductive material forming the gate electrode 121 and the second storage electrode 132 is formed on the first insulating substrate 110, the second gate material and the third gate material for forming the gate electrode 121 may be laminated, and the gate electrode is formed using a single mask.

In an alternative exemplary embodiment, as illustrated in FIG. 11, when forming the gate electrode using two masks, the gate electrode 121 includes the second gate layer 1212 and the third gate layer 1213 of FIG. 10, and the second storage electrode 132 may include or be formed of a single layer including or made of a transparent conductive material.

In an exemplary embodiment, as illustrated in FIGS. 13 and 14, and as described above with reference to FIG. 9, the first storage electrode 131 having a first width W1 and the second storage electrode 132 having a second width W2 are formed, and the second storage electrode 132 may also be formed by laminating a metallic material narrower than the transparent conductive material on a transparent conductive material. In such an embodiment, the second storage electrode 132 may include a second storage electrode layer 1322 including or formed of a metallic material on the first storage electrode layer 1321 including or formed of a transparent conductive material. Accordingly, in such an embodiment, the problems due to intrinsic characteristics of the transparent conductive material, for example, high resistivity compared to the metallic materials, may be effectively prevented. In such an embodiment, the metallic material formed on the second storage electrode 132 has a width capable of minimizing the reduction in the aperture ratio. In such an embodiment, to minimize the reduction in the aperture ratio, the metallic material 132d may not be formed on the second storage electrode portion 132b formed to overlap the vertical portion of the second stem PEa2 of the second sub-pixel electrode PE21 of the second storage electrode 132.

While the invention has been particularly illustrated and described with reference to exemplary embodiments thereof, it will be understood by those of ordinary skill in the art that various changes in form and detail may be made therein without departing from the spirit and scope of the invention as defined by the following claims. The exemplary embodiments should be considered in a descriptive sense only and not for purposes of limitation.

Although some exemplary embodiments and implementations have been described herein, other embodiments and modifications will be apparent from this description. Accordingly, the inventive concept is not limited to such embodiments, but rather to the broader scope of the presented claims and various obvious modifications and equivalent arrangements.

What is claimed is:

1. A liquid crystal display comprising:
a first substrate;
a second substrate which is disposed to face the first substrate and comprises a common electrode, and
a liquid crystal layer interposed between the first substrate and the second substrate,
wherein the first substrate comprises:
an insulating substrate;
a thin-film transistor which is disposed on the insulating substrate and comprises a gate electrode;
a first pixel electrode which is disposed on the insulating substrate to be spaced apart from the thin film transistor and receives a first voltage;
a second pixel electrode which is disposed on the insulating substrate to be spaced apart from the thin film transistor, is disposed in a same layer as the first pixel electrode and directly connected thereto, the second pixel electrode receives a second voltage having a magnitude different from a magnitude of the first voltage; and
a storage electrode which is disposed in a same layer as the gate electrode, and is disposed to overlap a portion of the second pixel electrode.

2. The liquid crystal display of claim 1, wherein the magnitude of the first voltage is greater than the magnitude of the second voltage.

3. The liquid crystal display of claim 1, wherein the storage electrode comprises a transparent conductive material.

4. The liquid crystal display of claim 1, wherein each of the first pixel electrode and the second pixel electrode has a pattern.

5. The liquid crystal display of claim 4, wherein the storage electrode overlaps only a portion of the pattern of the second pixel electrode.

6. The liquid crystal display of claim 1, wherein the gate electrode has a multi-layer structure comprising a transparent conductive material and a metallic material.

7. The liquid crystal display of claim 1, further comprising:
a shielding electrode which is disposed in a same layer as the first pixel electrode and the second pixel electrode to overlap the thin film transistor.

8. The liquid crystal display of claim 7, wherein a voltage applied to the shielding electrode has a same voltage level as a voltage applied to the common electrode.

9. A liquid crystal display comprising:
a first substrate;
a second substrate which is disposed to face the first substrate and comprises a common electrode, and
a liquid crystal layer interposed between the first substrate and the second substrate,
wherein the first substrate comprises:
an insulating substrate;
a thin-film transistor which is disposed on the insulating substrate and comprises a gate electrode;
a first pixel electrode which is disposed on the insulating substrate to be spaced apart from the thin film transistor and receives a first voltage;
a second pixel electrode which is disposed on the insulating substrate to be spaced apart from the thin film transistor, is disposed in a same layer as the first pixel electrode, and receives a second voltage having a magnitude different from a magnitude of the first voltage; and
a storage electrode which is disposed in a same layer as the gate electrode, and is disposed to overlap a portion of the second pixel electrode,
wherein the storage electrode comprises:
a first storage electrode layer comprising the transparent conductive material; and
a second storage electrode layer comprising a metallic material on the first storage electrode layer, and
wherein a width of the first storage electrode layer is wider than a width of the second storage electrode layer.

10. A liquid crystal display comprising:
a first substrate;
a second substrate which is disposed to face the first substrate, and comprises a common electrode; and
a liquid crystal layer interposed between the first substrate and the second substrate,
wherein the first substrate comprises:
an insulating substrate;

first to third thin film transistors disposed on the insulating substrate;
a first pixel electrode electrically connected to the first thin film transistor;
a second pixel electrode electrically connected to the second first thin film transistor;
a first storage electrode which is disposed to surround the first pixel electrode and has a pattern; and
a second storage electrode which is disposed to surround the second pixel electrode, has a pattern and is connected to the third thin film transistor,
wherein the first storage electrode or the second storage electrode overlaps only a portion of the pattern of the first pixel electrode or only a portion of the pattern of the second pixel electrode.

11. The liquid crystal display of claim 10, wherein the first storage electrode and the second storage electrode comprise a transparent conductive material.

12. The liquid crystal display of claim 10, wherein
each of the first storage electrode and the second storage electrode comprise a first storage electrode layer comprising a transparent conductive material, and
at least one of the first storage electrode and the second storage electrode further comprises a second storage electrode layer comprising a metallic material and disposed on the first storage electrode layer.

13. The liquid crystal display of claim 12, wherein a width of the first storage electrode layer is wider than a width of the second storage electrode layer.

14. The liquid crystal display of claim 10, wherein
the first pixel electrode receives a first voltage, and
the second pixel electrode receives a second voltage having a magnitude less than a magnitude of the first voltage.

15. The liquid crystal display of claim 14, wherein an area of the first pixel electrode is smaller than an area of the second pixel electrode.

16. The liquid crystal display of claim 10, further comprising:
a shielding electrode disposed in a same layer as the first pixel electrode and the second pixel electrode.

17. The liquid crystal display of claim 16, wherein a magnitude of a voltage applied to the common electrode is substantially the same as a magnitude of a voltage applied to the shielding electrode.

18. The liquid crystal display of claim 16, wherein a magnitude of a voltage applied to the shielding electrode is substantially the same as a magnitude of a voltage applied to the first storage electrode or the second storage electrode.

* * * * *